United States Patent [19]

Toriyama et al.

[11] Patent Number: 4,752,457
[45] Date of Patent: Jun. 21, 1988

[54] METHOD FOR PRODUCTION OF POROUS SPHERES OF CALCIUM PHOSPHATE COMPOUND

[75] Inventors: Motohiro Toriyama, Aza Kuroishi; Sukezo Kawamura, Inuyama, both of Japan

[73] Assignees: Agency of Industrial Science and Technology; Ministry of International Trade and Industry, both of Tokyo, Japan

[21] Appl. No.: 89,424

[22] Filed: Aug. 26, 1987

[30] Foreign Application Priority Data

Oct. 22, 1986 [JP] Japan .................................. 61-251392

[51] Int. Cl.$^4$ ............................................. C01B 25/32
[52] U.S. Cl. .................................... 423/308; 423/311
[58] Field of Search ............................... 423/308, 311

[56] References Cited

U.S. PATENT DOCUMENTS 3,737,516 6/1973 Jenner .................................. 423/308
4,195,366 4/1980 Jarcho et al. ........................ 423/311

Primary Examiner—John Doll
Assistant Examiner—Wayne A. Langel
Attorney, Agent, or Firm—Oblon, Fisher, Spivak, McClelland & Maier

[57] ABSTRACT

Porous spheres of calcium phosphate compound are produced by preparing an aqueous solution containing a water-soluble calcium salt, a calcium ion complexing agent, and a water-soluble phosphate, adjusting the pH of the aqueous solution, adding hydrogen peroxide to the aqueous solution, and heating the resultant mixture.

8 Claims, 1 Drawing Sheet

METHOD FOR PRODUCTION OF POROUS SPHERES OF CALCIUM PHOSPHATE COMPOUND

BACKGROUND OF THE INVENTION

This invention relates to a novel method for the production of porous spheres of calcium phosphate compound. More particularly, this invention relates to a method for the production of porous spheres of calcium phosphate compound possessing a large specific surface area and uniform sphere diameter and pore diameter and useful as a material for filling cavities in human teeth or bones and as a stationary phase material for liquid chromatography.

It has been known that calcium phosphate compounds show specific affinity for vital tissues and vital components and, therefore, are usable as a material for filling cavities in bones. For example, it has been known that apatite hydride is the main component of such rigid vital tissues as bones and teeth and that when it is used as a filling material for repairing bones, it exhibits an ability to induce growth of bone tissues on the surface of its own mass. Tricalcium phosphate is also usable as a material for repairing bones. It has been known that these compounds are integrally combined with bone and then dissolved and absorbed so as to substitute for bone.

Further, it has been known that these calcium phosphate compounds exhibit specific affinity for such vitally related substances as amino acids, proteins, and hormones and, therefore, are usable as stationary phase materials for chromatographic separation and concentration of these substances.

For the calcium phosphate compounds to be effectively used for the purpose just mentioned, they are required to be in the form of porous spheres having a large specific surface area and substantially uniform sphere diameter and pore diameter.

Heretofore, as means for producing porous particles of calcium phosphate, a method which comprises first preparing calcium phosphate powder by dry and wet method and then converting this powder into porous particles through the steps of molding, sintering, pulverization, and classification, for example, has been widely used.

With this method, however, the process of production is complicated and the shape of the porous particles formed, the particle diameter and the pore diameter thereof are difficult to control. Use of this method to obtain porous particles with the desired properties, therefore, inevitably entails inferior productivity and high cost of production.

This invention has been attained for the purpose of overcoming the drawbacks suffered by the conventional methods for production of porous particles of calcium phosphate compound described above and providing a method capable of producing, through a simple procedure, porous spheres of calcium phosphate compound having a large specific surface area and substantially uniform sphere diameter and pore diameter without entailing any difficulty in the control of the shape of the spheres, the sphere diameter, and the pore diameter.

OBJECT AND SUMMARY OF THE INVENTION

The inventors continued a study in search of a method for efficient production of porous spheres of calcium phosphate compound. As the result of this study, they found that porous spheres of calcium phosphate compound having a large specific surface area and substantially uniform sphere diameter and pore diameter are obtained by preparing an aqueous solution containing a water-soluble calcium salt, a calcium ion complexing agent, and a water-soluble phosphate in a prescribed ratio and having a pH value in a prescribed range, adding hydrogen peroxide to this aqueous solution in an amount calculated to account for a prescribed concentration, and subjecting the resultant mixture to a thermal reaction. This invention has been perfected on the basis of this knowledge.

To be specific, this invention is directed to a method for the production of porous spheres of calcium phosphate compound, characterized by the steps of preparing an aqueous solution containing 1 mol of a water-soluble calcium salt, 1 to 1.2 mols of a calcium ion complexing agent, and 0.5 to 1 mol of a water-soluble phosphate, adjusting the pH value of the aqueous solution to a level in the range of 5 to 11, then adding thereto hydrogen peroxide up to a concentration falling in the range of 1 to 20% by weight, and subjecting the resultant mixture to a thermal reaction at a temperature in the range of 50° to 100° C. thereby giving birth to porous spheres.

DETAILED DESCRIPTION OF THE PREFERRED EMBODIMENT

Figure 1:
FIG. 1 is a photograph of apatite hydride spheres produced by the procedure of Example 2, taken with an electron microscope at 13,000 magnifications.

The method of the present invention requires use of the three components, i.e. a water-soluble calcium salt, a calcium ion complexing agent, and a water-soluble phosphate, as raw materials. As examples of the water-soluble calcium salt, there can be cited calcium nitrate, tetrahydrate thereof, calcium chloride, monohydrate, dihydrate, and hexahydrate thereof, calcium formate, and calcium acetate. As examples of the calcium ion complexing agent, there can be cited ethylenediamine tetraacetate, cyclohexanediamine tetraacetate, and diethylenetriamine hexaacetate. Then as examples of the water-soluble phosphate, there can be cited ammonium dihydrogen phosphate and diammonium hydrogen phosphate.

The ratio of the aforementioned water-soluble calcium salt and water-soluble phosphate to be contained in the aqueous solution is required to fall in the range of 1:1 to 1:0.5 by mol. The porous spheres of calcium phosphate compound aimed at by the present invention are not obtained if this ratio deviates from the range mentioned above.

Then, the ratio of the water-soluble calcium salt and the calcium ion complexing agent to be contained is required to fall in the range of 1:1 to 1:1.2.

The calcium ion complexing agent serves the purpose of preventing otherwise possible precipitation of a calcium phosphate compound in the aforementioned aqueous solution prior to the incorporation therein of hydrogen peroxide and the thermal reaction. If the amount of this calcium ion complexing agent is less than 1 mol per mol of the water-soluble calcium salt, then the precipitation of a calcium phosphate compound occurs before the thermal treatment and the desired porous spheres are not produced. The complexing agent is not required to be used in an amount exceeding 1.2 mols. If it is used in an unduly large amount, the excess of the complexing agent jeopardizes the economy of the production and exerts an adverse effect upon the formation of porous spheres as well.

The combined concentration of the three components in the aqueous solution is not specifically restricted so long as it falls in the range in which no precipitation is induced in the aqueous solution. Generally, this range is from 5 to 30% by weight.

The method of the present invention then requires the pH value of the aforementioned aqueous solution to be adjusted to within the range of 5 to 11. If this pH value deviates from the range just mentioned, the product obtained does not acquire the quality and shape aimed at by the invention. By suitably adjusting the pH value to within this range, then effecting the addition of hydrogen peroxide and the thermal reaction in the manner to be described below, porous spheres of various calcium phosphate compounds can be obtained. When the pH value is adjusted in the proximity of 6 (i.e. at or around 6), for example, there are formed porous sphers of tricalcium phosphate. When it is adjusted in the proximity of 10 (i.e. at or around 10) there are obtained porous spheres of apatite hydride. When the pH value is adjusted to within the range of 7 to 9, there are produced porous spheres of a mixed phase of apatite hydride and tricalcium phosphate.

Now, the treatment to be given to the aqueous solution containing the aforementioned three components will be described below. To the aforementioned aqueous solution, an aqueous hydrogen peroxide solution is added until the concentration of hydrogen peroxide in the combined aqueous solution reaches a level in the range of 1 to 20% by weight. Then, the resultant mixture is subjected to a thermal treatment at a temperature in the range of 50° to 100° C.

In consequence of the incorporation of hydrogen peroxide and the thermal treatment, the calcium ion complexing agent is decomposed in the form of oxidation by the hydrogen peroxide and consequently is deprived of the ability to form a complex with calcium ion, with the result that the calcium ion reacts with the phosphate ion to give rise to a calcium phosphate compound. Since this reaction proceeds isotropically, there are consequently formed porous spheres of calcium phosphate.

If the concentration of hydrogen peroxide is less than 1% by weight, the effect of the addition of hydrogen peroxide is not fully manifested. If the concentration exceeds 20% by weight, the excess does not bring about any proportionate increase in effect but is believed rather to degrade the economy of the production. If the heating temperature is less than 50° C., the oxidizing power of hydrogen peroxide is not fully manifested. If it exceeds 100° C., there ensues a disadvantage that the aqueous solution will be boiled. At a lower temperature than 100° C., the oxidizing power of hydrogen peroxide can be sufficiently manifested.

In the method of the present invention, the velocity of the oxidation of the calcium ion complexing agent can be controlled by suitably adjusting the concentration of hydrogen peroxide and the heating temperature in the aforementioned respective ranges. By the same token, the diameter of the porous spheres of calcium phosphate compound can be adjusted. By selecting the concentration of hydrogen peroxide and the heating temperature at lower levels in the respective ranges, for example, the porous spheres to be obtained have a large diameter. By selecting them at higher levels, the porous spheres are produced with a small diameter.

Figure 2:
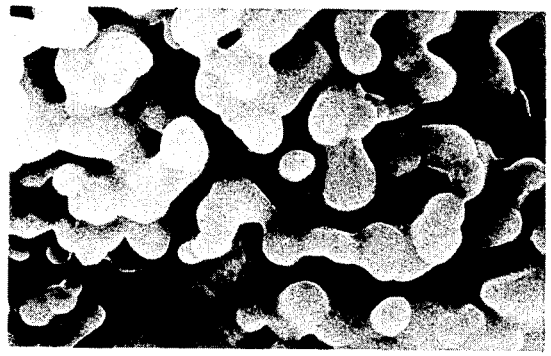
FIG. 2 is a photograph of apatite hydride spheres produced by the procedure of Example 3, taken with an electron microscope at 15,000 magnifications.

The porous spheres formed as described above can be separated from the reaction mixture by any of the conventional methods such as, for example, filtration, centrifugal separation, and decantation. These porous spheres possess countless needle-shaped projections. The fine interstices intervening between these projections form the pores of the spheres. These porous spheres which resemble chestnuts in their burrs possess pores of substantially uniform diameter. These porous spheres may be used in their unmodified form, depending on the particular kind of application. Where the pores in the porous spheres are desired to be in the form of cylinders, their production can be attained by carrying out the thermal treatment at a temperature in the range of 900° to 1,500° C. The conditions of the porous spheres before and after the thermal treatment are illustrated in FIG. 1 and FIG. 2 which are photomicrographs of the products obtained by the procedures of Examples 2 and 3. As illustrated in FIG. 1, the porous sphere comprises countless hexagonal-column crystals which are euhedral for needle-shaped apatite hydride crystals and, therefore, assume the appearance of chestnut burrs. FIG. 2 illustrates a porous sphere in which the columnar crystals thereof have been sintered, the sphere itself contracted, the intervals between the crystals shortened, and the pores shrunken in the form of cylinders in consequence of a thermal treatment. From the results of the experiments, it is noted that the sintering proceeds to a great extent and the pore diameter decreases in proportion as the heating temperature increases.

The method of the present invention produces porous spheres of calcium phosphate compound by the technique of homogeneous precipitation and not by the technique of high-temperature solid-phase reaction. It is, therefore, capable of producing porous spheres of calcium phosphate compound, i.e. calcium phosphate, apatite hydride, or a mixture thereof, having high crystallinity at a low energy cost with a simple procedure. Further, it is characterized by exhibiting an ability to produce porous spheres possessing a pore diameter, a mixing ratio of tricalcium phosphate and apatite hydride, a sphere diameter, and a particle shape exactly matched to a given application. This method, therefore, enjoys a great economic significance.

The porous spheres of calcium phosphate obtained by the method of this invention has a large specific surface area and uniform sphere diameter and pore diameter and, moreover, excels in vital affinity. It is, therefore, useful as a filling material for bones and as a stationary phase material for liquid chromatography.

Now, the present invention will be described more specifically below with reference to working examples.

EXAMPLE 1

Calcium nitrate, diammonium ethylenediamine tetraacetate, and diammonium hydrogen phosphate were dissolved in a molar ratio of 1:1.2:0.67 in water, to prepare an aqueous solution having a total solids concentration of 15% by weight. The pH value of this aqueous solution was adjusted to 6 by the addition of aqua ammonia.

Then, to this aqueous solution, an aqueous 35% hydrogen peroxide solution was added until the concentration of hydrogen peroxide in the aqueous solution reached 3% by weight. The resultant mixture was heated at 100° C. for four hours. The porous spheres consequently formed were separated by filtration.

These porous spheres were found to be composed of tricalcium phosphate.

EXAMPLE 2

Porous spheres of calcium phosphate compound were produced by following the procedure of Example 1, except that the molar ratio of calcium nitrate, diammonium ethylenediamine tetraacetate, and diammonium hydrogen phosphate was changed to 1:1.2:0.6, the pH value to 10, and the heating temperature to 70° C.

These porous spheres were found to be composed of apatite hydride and have an average sphere diameter of about 50 $\mu$m and an average surface area of about 10 $m^2/g$.

A photograph of these porous spheres taken with an electron microscope at 13,000 magnifications to show the sphere structure is shown in FIG. 1. As illustrated by the photograph, the porous spheres contained fine pores.

EXAMPLE 3

Porous spheres of calcium phosphate compound produced by faithfully following the procedure of Example 2 were heated at 1,100° C. for one hour.

These porous spheres were found to be composed of apatite hydride and have a particle diameter of about 50 $\mu$m and an average surface area of about 6 $m^2/g$. They possessed fine pores different in shape from those in the porous spheres of calcium phosphate compound of Example 2.

A photograph of these porous spheres taken with an electron microscope at 15,000 magnifications to show their particle structure is shown in FIG. 2.

EXAMPLE 4

Porous spheres of calcium phosphate compound were produced by faithfully following the procedure of Example 1, except that the pH value of the aqueous solution was changed to 8.

These porous spheres were found to be composed of 80 mol % of tricalcium phosphate and 20 mol % of apatite hydride and have a particle diameter of about 50 $\mu$m.

What is claimed is:

1. A method for the production of porous spheres of calcium phosphate compound, characterized by the steps of preparing an aqueous solution containing 1 mol of a water-soluble calcium salt, 1 to 1.2 mols of a calcium ion complexing agent, and 0.5 to 1 mol of a water-soluble phosphate, adjusting the pH value of said aqueous solution to a level in the range of 5 to 11, then adding thereto hydrogen peroxide up to a concentration falling in the range of 1 to 20% by weight, and subjecting the resultant mixture to a thermal reaction at a temperature in the range of 50° to 100° C. thereby giving birth to porous spheres.

2. The method according to claim 1, wherein the combined concentration of said water-soluble calcium salt, said calcium ion complexing agent, and said water-soluble phosphate in said aqueous solution is in the range of 5 to 30% by weight.

3. The method according to claim 1, wherein said water-soluble calcium salt is at least one member selected from the group consisting of calcium nitrate, tetrahydrate thereof, calcium chloride, monohydrate, dihydrate, and hexahydrate thereof, calcium formate, and calcium acetate.

4. The method according to claim 1, wherein said calcium ion complexing agent is at least one member selected from the group consisting of ethylenediamine tetraacetates, cyclohexanediamine tetraacetates, and diethylenetriamine hexaacetates.

5. The method according to claim 1, wherein said water-soluble phosphate is at least one member selected from the group consisting of ammonium dihydrogen phosphate and diammonium hydrogen phosphate.

6. The method according to claim 1, wherein said pH value is adjusted to about 6 and the porous spheres being consequently produced will be composed of tricalcium phosphate.

7. The method according to claim 1, wherein said pH value is adjusted to about 10 and the porous spheres being consequently produced will be composed of apatite hydride.

8. The method according to claim 1, wherein said pH value is adjusted in the range of 7 to 9 and the porous spheres being consequently produced will be composed of a mixed phase of apatite hydride and tricalcium phosphate.

* * * * *